J. POLLITT.
Stop-Pulleys.
No. 150,186. Patented April 28, 1874.
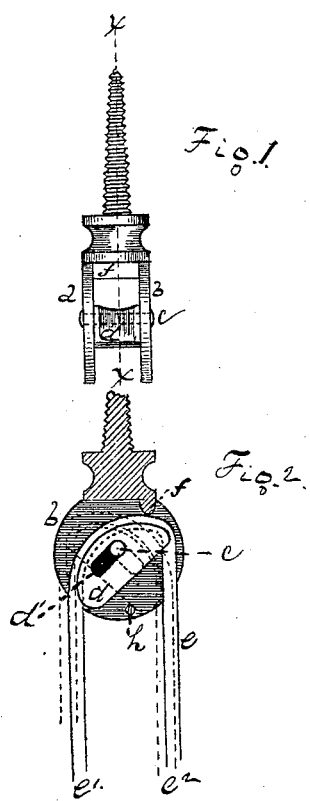
Witnesses.
John R. Wittig.
James H. Lyons.
Inventor.
John Pollitt.
By Wm. E. Simonds.
Atty.

UNITED STATES PATENT OFFICE.

JOHN POLLITT, OF HARTFORD, ASSIGNOR TO WILLARD M. WHITE, OF CANTON, CONNECTICUT.

IMPROVEMENT IN STOP-PULLEYS.

Specification forming part of Letters Patent No. 150,186, dated April 28, 1874; application filed March 23, 1874.

*To all whom it may concern:*

Be it known that I, JOHN POLLITT, of Hartford, in the county of Hartford and State of Connecticut, have invented an Improved Stop-Pulley, of which the following is a specification, reference being had to the accompanying drawings, where—

Figure 1 is what may be called a face view of the pulley. Fig. 2 is a view of the same in central vertical section on the plane indicated by the dotted line $x\ x$.

The invention is a device over which a pulley-cord will run either way, at the will of the operator, though the cord may be caught and stopped when desired.

The letters $a$ and $b$ indicate the two side plates, and $c$ the shaft of the so-called pulley $d$, which is not really a pulley—that is, it does not rotate—over which the cord $e$ slips. This pulley has the slot $d'$, to assist its action.

Supposing the weight to be at the end $e^1$ of the cord, and the operator's hand to have hold of the other end, $e^2$, by pulling down upon the end $e^2$, the pulley will be tilted in the opposite direction from that shown in Fig. 2; and, if the pulley be slotted, as shown, the pulley will fall to the opposite end of the slot. The cord will follow the operator's hand freely. The cord will slip back in the opposite direction, if the operator permit; not, however, letting up enough on the cord to permit the pulley to tilt, as shown in Fig. 2. If the operator permit the cord to slip back quite freely, the pulley will tilt, as shown in Fig. 2, and will be caught between the pulley and the spur $f$, and thus held suspended.

A stop-spur, $h$, prevents the force exerted by the operator's hand from tilting the pulley too far.

I claim as my invention—

The combination of the shaft $c$, the so-called tilting pulley $d$, hung eccentrically on its shaft, and provided with the slot $d'$, and the stationary overhanging spur $f$, all constructed and designed for operation and use substantially as shown and described.

JOHN POLLITT.

Witnesses:
WM. E. SIMONDS,
JOHN R. WITTIG.